United States Patent [19]

Thumm et al.

[11] 4,036,086
[45] July 19, 1977

[54] THREAD CUTTING APPARATUS AND METHOD OF OPERATING SAME

[76] Inventors: Helmut Thumm, Oschweg 45, D 7418 Metzingen; Lothar Reusch, Mozartstrasse 9, D 7410 Reutlingen 27; Rainer Wahl, Jorglestrasse 17, D 7441 Grafenberg, all of Germany

[21] Appl. No.: 650,939

[22] Filed: Jan. 21, 1976

[30] Foreign Application Priority Data

June 14, 1975 Germany ............................ 2526742

[51] Int. Cl.² ............................................. B23B 21/00
[52] U.S. Cl. ......................................... 82/24 R; 82/5
[58] Field of Search ................................... 82/5, 24 R

[56] References Cited

U.S. PATENT DOCUMENTS

| 2,686,448 | 8/1954 | Leifer et al. | 82/24 R |
| 2,903,933 | 9/1959 | MacKenzie | 82/5 |
| 3,087,365 | 4/1963 | Rose et al. | 82/5 |

*Primary Examiner*—Leonidas Vlachos
*Attorney, Agent, or Firm*—Roylance, Abrams, Berdo & Kaul

[57] ABSTRACT

A cutting tool is mounted on a tool slide which is movable along a workpiece to cut a thread therein or thereon. The tool is shiftable toward and away from the workpiece by a piston and cylinder arrangement having a fixed stroke length. Adjustment of the starting and therefore the ending point of the stroke is accomplished by a differentially threaded assembly which is rotated by a drive motor. Rotation of the threaded assembly produces pulses which are counted and compared with a stored count to start and stop the drive motor. Cycles of operation are also counted and compared with fixed counts, the extent of adjustment in each cycle being related to the number of cycles.

11 Claims, 4 Drawing Figures

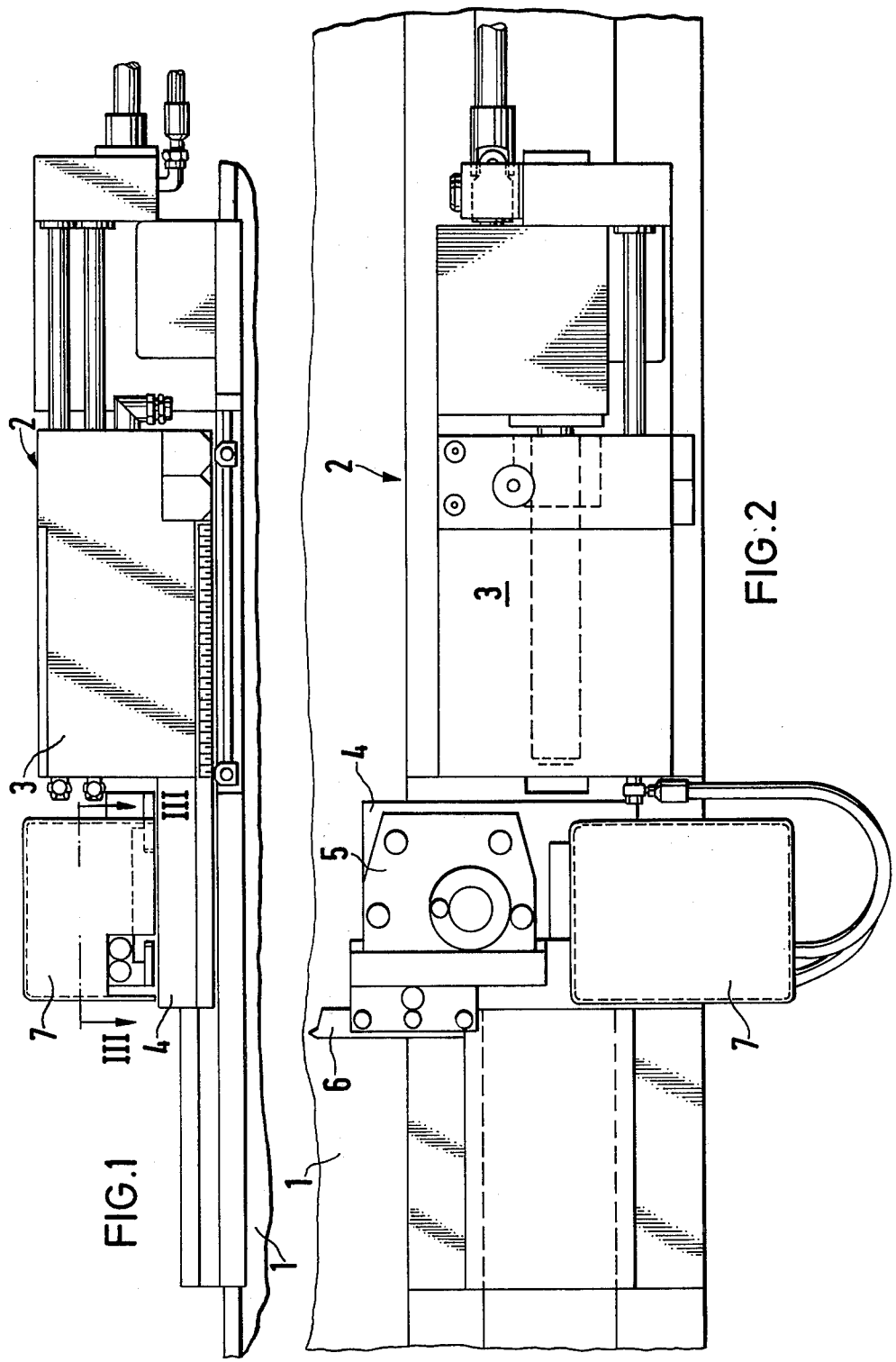

THREAD CUTTING APPARATUS AND METHOD OF OPERATING SAME

This invention relates to apparatus for cutting threads on a turning machine.

In a prior art threading attachment of the general type of the present invention and as shown in German Pat. No. 2,441,974, there is provided a shaft connected to the piston rod of a piston and cylinder assembly having its longitudinal axis perpendicular to the longitudinal direction of motion of the basic machine tool slide. The shaft has a slide disposed at an angle of less than 45° on which a slide ring, fixedly attached to the tool slide, is shiftable. The operating cylinder of the piston and cylinder assembly, attached to the longitudinal slide, can be controlled by microswitches operable by means of the slide. The cutting depth is variable depending on the positions of adjustable stops.

The present invention is for the purpose of simplifying the adjustment arrangement for the tool slide and for minimizing the number of adjusting elements. As a result of the apparatus disclosed herein, a part of an operating cylinder, shiftable in relation to the tool slide, is adjustable at an angle transverse to the longitudinal axis of the workpiece to set the cutting depth of the thread cutting tool. One adjusting member is generally sufficient, resulting in a more compact construction. Considerable simplication, especially as compared with a structure having multiple adjustable stops, is also achieved. In addition, fine, accurate adjustment can be obtained, even with the use of coarse threads in the adjusting members, which threads can withstand large forces.

Briefly described, the apparatus includes, in a turning machine of the type having a longitudinal slide path and a tool slide longitudinally movable along the path, the apparatus comprising a tool; means for supporting said tool on the tool slide, said means comprising a piston and cylinder assembly including a piston member and a cylinder member, one of said members being mounted on said tool slide and being longitudinally movable with said tool slide, and the other of said members being laterally movable relative to said one member by application of fluid pressure to said assembly, said tool being mounted on said other of said members; and means for adjusting the lateral position of said other member, said means including a drive motor.

The adjusting means can include a threaded extension member connected to the laterally movable one of said members and a rotatable adjusting collar engaging said extension member, said collar having an internal thread and an external thread, the internal thread having a pitch different from the external thread.

In order that the manner in which the foregoing and other objects are attained in accordance with the present invention can be understood in detail, a particularly advantageous embodiment thereof will be described with reference to the accompanying drawings, which form a part of this specification, and wherein FIG. 1 is a partial side elevation of a machine tool incorporating the present invention;

FIG. 2 is a plan view of the apparatus of FIG. 1;

Figure 3:
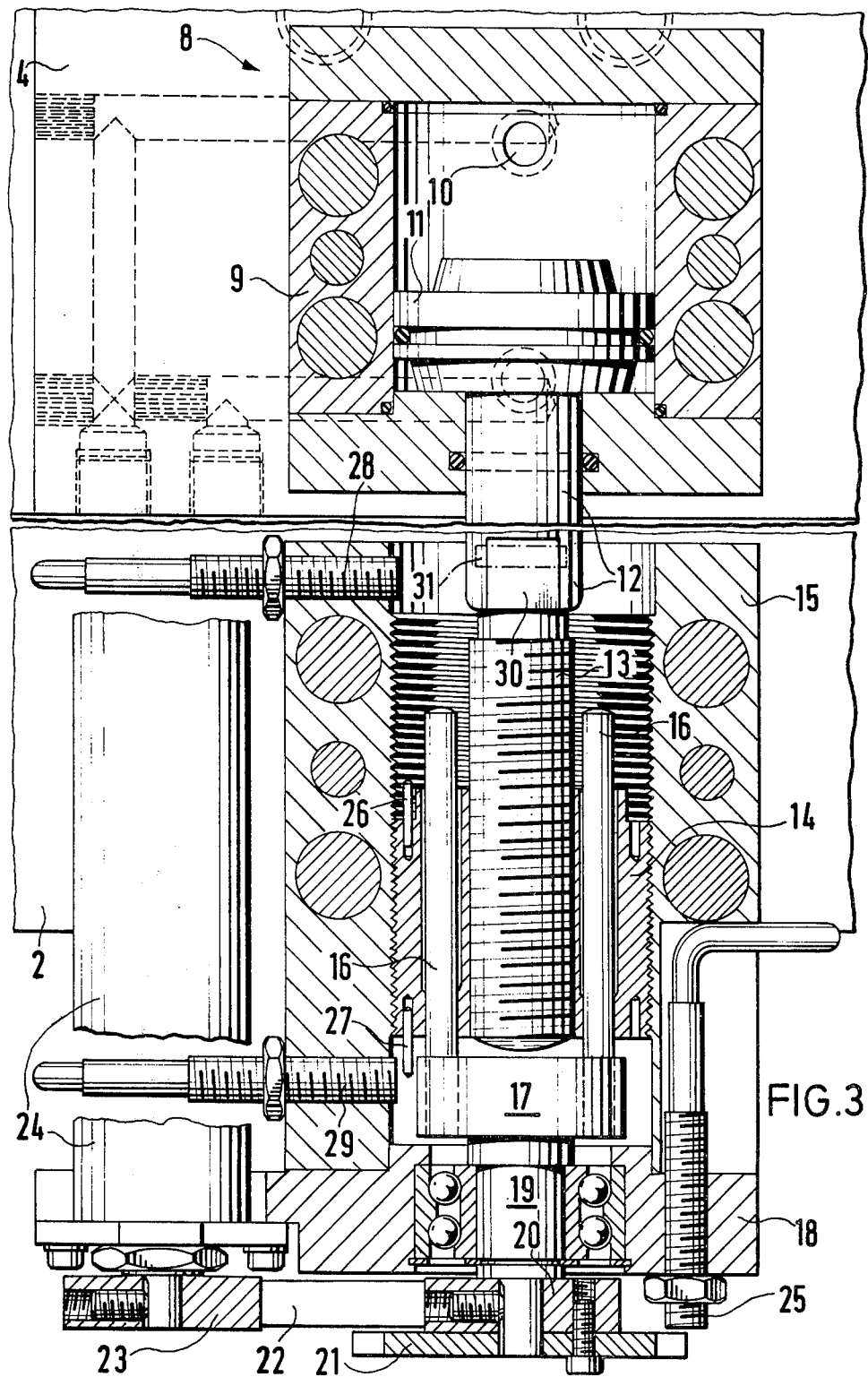
FIG. 3 is a section along lines III—III of FIG. 1.

As shown in FIGS. 1-3, a longitudinal slide 2 is shiftably mounted on a machine bed 1 of a machine tool, only a small section of which is shown in FIG. 1. Slide 2 is longitudinally shiftable by means of an operating mechanism 3 which is of a generally conventional nature and which has a driving spindle. The path to be travelled in the longitudinal shifting of the slide is adjustable.

On a slideway disposed on longitudinal slide 2 is a tool slide 4 which is shiftable at a right angle with respect to the direction of motion of the longitudinal slide. Tool slide 4 carries a tool holder 5 to which is fastened a cutting tool 6. FIG. 3 shows a driving mechanism for the tool slide 4, the apparatus in FIG. 3 being shown with a bond 7 removed to expose the interior elements thereof. As seen in FIG. 3, an operating cylinder 8 is disposed on tool slide 4, the operating cylinder including a cylinder jacket 9 which is attached to tool slide 4 and which has feed and discharge lines, one of which is connected to outlet 10 in cylinder jacket 9 as shown in FIG. 3. An operating piston 11 is axially shiftably mounted in cylinder jacket 9, the end surfaces of piston 11 being cooperative with the end walls of cylinder jacket 9 to limit the axial motion of the piston. A piston rod 12 is connected to piston 11 and extends through an end wall of jacket 9 and is connected to an adjustment mechanism which determines the extent to which piston rod 12 protrudes laterally with respect to housing 7 and, therefore, the lateral position of tool 6 and the depth of cut to be made in the workpiece by the tool as it moves longitudinally along slide 2. Rod 12 is provided with a threaded portion 13 at its free end. An internally threaded nut 14 threadedly engages the externally threaded portion 13 of piston rod 12, nut 14 also being externally threaded to threadedly engage and cooperate with the internally threaded portion of a screw bushing 15 which is fixedly mounted on longitudinal slide 2. The internal and external threads of nut 14 are developed as differential threads, that is, the interior threads have a different pitch from the exterior threads. As an example, the interior threads can have a pitch of 2 millimeters and the exterior threads a pitch of 2.5 millimeters.

Nut 14 is penetrated by two driving pins 16 which are mounted in a disc 17. Disc 17 is mounted on one end of a shaft 19 which is rotatably mounted, as by ball bearings, in a holding disc 18 which is fixedly attached to screw bushing 15. A driving disc 20 and a star-shaped impulse plate 21 are mounted on the other end of shaft 19 and are rotatable with the shaft. Driving disc 20 is connected with the driving pulley 23 of a d.c. geared motor 24 by means of a toothed belt 22, the motor being disposed with its axis in parallel to the axis of piston rod 12. A non-contact pulse generator 25 is mounted near signal disc 21 and is a transducer which is responsive to the proximity of the protrusions on disc 21 to produce electrical pulses. Pegs 26 and 27 are inserted into opposite ends of nut 14. Peg 26 cooperates with a pulse generator 28 and peg 27 with a pulse generator 29, one of which is always disposed adjacent one end of threaded bushing 15. The pulse generator 28 determines the starting position of nut 14 during the production of an inside thread and pulse generator 29 determines the starting position of nut 14 during production of an outside thread.

For the purpose of securing piston rod 12 against rotation, the rod is provided with a flat beveled portion 30 which cooperates with a non-rotating securing plate 31, shown in phantom lines in FIG. 3, plate 31 being attached to threaded bushing 15.

Signal disc 21 is provided with a plurality of serrations or indentations which are circularly spaced at even distances about its circumference, forming a plurality of equally spaced protrusions. Ten such serrations can conveniently be provided. A first counter Z1 (FIG. 4) which will be referred to as a true or actual value transmitter is connected in series electrical relationship with pulse generator 25 which cooperates with signal plate 21, the counter being connected with a comparator V11 to be referred to as a theoretical or desired value transmitter, into which a predetermined fixed number of pulses is initially set. Comparator V11 is connected with counter Z1 through a conductor 41 and with the stop input to the VO portion of a START-STOP switch control VO/RU for driving motor 24 via conductor 42 by means of which the tool slide 4 is adjusted on longitudinal slide 2, in a manner to be hereinafter described. As will be indicated, comparator V11 functions to reset counter Z1. The START-STOP switch control VO/RU is arranged so that the VO portion of this device controls the starting and stopping of drive motor 24 in one rotational direction and the RU portion controls starting and stopping of motor 24 in the opposite rotational direction. When outside threads are being cut, the VO portion controls the foward movement, i.e., the movement in the direction toward the axis of the workpiece while the RU portion controls the backward or retraction movement away from the axis. When inside threads are being cut, the reverse is true, i.e., the RU portion controls the advancing or forward movement (which would then be away from the workpiece axis) and the VO portion controls the retraction movement.

Additional comparator circuits V12, V13, and others up through V18 are connected to conductor 40, these comparators likewise being connected with conductor 41 for resetting counter Z1 and, in a corresponding manner, also with conductor 42 for stopping driving motor 24.

A control apparatus ST, which controls the operating cycle of the threading device, performs the function of starting driving motor 24, control ST being connected to the start input of the VO portion of the START-STOP switching arrangement. A second counter Z2 which acts as a true or actual value transmitter for the number of operating cycles carried out by the thread cutting device in processing a workpiece, is connected to control apparatus ST. A plurality of comparators V21, V22, V23 . . . V28 and V29 are connected in series relationship by means of conductors 51, 52, 53 . . . 58 and 59 with counter Z2. Each of comparators V21-V29 is connected with counter Z2 through conductor 45 in order to reset the counter. One of a plurality of arbitrarily adjustable selector switches W1, W2, W3 . . . W8 and W9 is assigned to each of the comparators V21, V22, V23 . . . V28 and V29.

Comparator V11 is connected to conductor 51, comparator V12 is connected with conductor 52, comparator V13 to conductor 53 and comparator V18 with conductor 58. Conductor 59 is connected to conductor 42. The output function of a terminal switch E is connected to comparator V29 to control apparatus ST and also to the start input RU of the START-STOP switching arrangement for the return of the driving motor 24. Another output of limit switch E is connected through conductor 43 with the stop input of the START-STOP switching device. Pulse generators 28 and 29 are also connected to conductor 43, either pulse generator 28 or 29 being active, depending on whether an outside or an inside thread is being cut.

A manually operated pulse generator H and the start input of the START-STOP switching device VO are connected to conductor 44, interconnecting the control apparatus ST and counter Z2.

Each of comparators V11-V18 is fixedly preset to a certain count (number of pulses) to establish a certain positioning of the tool in the direction of arrow AB (depth of cut). The arrow Ab is regarded as a sign for a positioning movement of the tool in this direction. Each of the comparators is preadjusted to a different number of pulses, each thereby determining a different depth of cut. Whenever, as indicated, V11 is set for 20 pulses and each pulse signifies a cutting depth of 0.05 mm, then operation of this comparator determines a cut depth of 1.0 mm. The number of the present pulse count decreases in comparators V12 to V18, thereby fixing smaller depths of cut with those comparators.

Each selector switch W1, W2, . . . W9 can be arbitrarily adjusted to establish a number of cycles of cut to be made in the workpiece on each one of a succession of 9 possible cycle sequences along the workpiece. Clearly, any one of the selector switches can be set to zero so that no cycle of the cutting tool takes place on that pass and, therefore, no further deeper cut is made. The adjustment to be made for each cycle sequence is set into one of counters (comparators) V21-V29 by its switch and the actual depth-of-cut adjustment made by motor 24, which drives signal disc 21 is counted by counter Z1, the count in that counter being compared with the desired number of pulses by one of comparators V11-V18. If, for example, a selecting switch W1 is adjusted for three cycles ABCDA, then three cuts are made at the depth determined by comparator V11. Within the block representing the control apparatus ST, the operating cycle to be carried out by the thread cutting apparatus is shown schematically by rectangular arranged arrows, the starting points of the arrows being identified by the letters A, B, C and D. The starting position of the thread cutting apparatus is designated A. In the first stage of the cycle, the tool is set against the workpiece by the entire stroke of the operating cylinder from A to B by application of fluid pressure to one input of operating cylinder jacket 9 which causes the operating cylinder to move relative to piston 11, these moving the operating cylinder 8 above tool slide 4. Thereafter, in order to produce a cut-in for a thread, the tool carrying and adjusting apparatus of FIG. 3 is moved along the longitudinal slide, and thus along the workpiece, from B to C. In position C, a pulse is produced by means of a limit switch, not shown, which pulse appears at the output of control apparatus ST. At the end of this first cutting process of the tool, the tool slide 4 is moved in the direction CD by application of fluid pressure to the other input to jacket 9 and subsequently the longitudinal slide 2 is moved in the direction DA which returns the apparatus to starting point A. After the tool has been lifted out of the cut-in recess made in the workpiece, the tool slide 4 and longitudinal slide 2 can return simultaneously. Having arrived at starting point A, a new cycle begins immediately so long as there is no signal for stopping the thread cutting operation in the control apparatus ST. In the process of the next setting up of tool slide 4 to move tool 6 against the workpiece, the tool engages the previously cut groove at a greater cutting depth and cuts an additional shaving from the workpiece.

The pulse delivered by the thread cutting mechanism in the course of each cycle, preferably after the cutting process, starts the driving motor 24 through the START-STOP apparatus VO. These pulses, one pulse per cycle, are counted in the counter Z2 and the contents of counter Z2 are continuously compared with the count contained in comparator V21. As soon as the counts in these two counters are equal, counter Z2 is reset and a signal from comparator V21 is connected to comparator V22. Then, the accumulated count in counter Z2 is compared with the count in comparator V22 and when these two counts are equal, counter Z2 is again reset and a signal from comparator V22 is put through to comparator V23. This continues up to comparator V29 which finally completes a connection through to terminal switch E which stops the thread cutting apparatus through control apparatus ST as soon as longitudinal slide 2 and tool slide 4 have reached the starting position A.

The pulses produced by signal plate 21 in pulse generator 25 are counted by counter Z1, the accumulated count of which is compared with the predetermined content of comparator V11. When the count in these two devices is equal, counter Z1 is reset by comparator V11. Comparators V11, V12, V13 . . . V18 are always connected with conductors 51, 52, 53 . . . 58, respectively. As long as comparator V21 is not connected through, comparators V12, V13 . . . V18 remain without influence, i.e., they have no effect on the operation of the adjusting mechanism. However, when comparator V21 connects through, then comparator V12 becomes operative and V11 become ineffective. The same pertains for the remaining comparators V13-V18, so that comparators V11 and V21 become effective together, as do comparators V12 and V22, V13 and V23, in respective sequence.

As soon as the contents of counter Z1 and of comparator V11 are equal, the driving motor 24 is stopped by the START-STOP apparatus VO/RU. The motor is started by a pulse from control apparatus ST or from the manually operated start device H. Comparator V11 remains operatively associated with counter Z1 until comparators V22 and V12 become effective by connection through comparators V21. At that time, the comparator is connected with the counter Z1 and the contents of counter Z1 are compared with comparator V12. The same is true also for the remaining comparators V13-V18. After each cutting process in the course of one cycle, the tool is adjusted in the shifting direction of tool slide 4 as compared to the longitudinal slide 2 until comparator V28 connects through to comparator V29. Since, as a result of that, counter Z1 and comparators V11-V18 become ineffective, driving motor 24 stops during the next operating cycle and nut 14 is not turned during these operating cycles. After switching comparator 29 through, the limit switch is operated which stops the operating cycles through control arrangement ST and causes the reverse operation of driving motor 24 by running it in a counter direction through the START-STOP apparatus until nut 14 has returned to its starting position which is signaled by a pulse from pulse generator 29 when an outside thread is being produced or from pulse generator 28 when an inside thread is being produced. The pulse produced by the appropriate one of pulse generators 28 or 29 stops the driving motor 24 through START-STOP apparatus RU.

At this stage the thread cutting mechanism is ready for the completion of a new workpiece. It can be started again by a pulse fed manually into control device ST.

In a practice embodiment of the apparatus, the mutual positions of piston rod 12 and threaded bushing 15 are changed in the amount of about 0.5 millimeters on the basis of the differential relationship established by one revolution of nut 14. Since signal plate 21 has 10 serrations, the adjustment amounts to 0.05 millimeters between two successive pulses produced by signal plate 21 in pulse generator 25. Thus, comparators V11, V12, V13 . . . V18 produce, respectively, 20, 15, 10 and 1 pulses whenever the comparator V12 is connected actively with counter Z1 and the driving motor is stopped whenever signal plate 21 and thus nut 14 have been rotated by 1.5 revolutions.

Whenever the selection switch W1 has been adjusted for two pulses, this means that two cutting cycles ABCD will be performed each at the cutting depth determined by its associated one of comparators V11-V18, i.e., 1 mm. in the case of V11. When selector switch W2 is set at zero, then no cut at the present depth of 0.75 millimeters is carried out. In the event that selector switch W3 is adjusted for four cycles, the cutting depth is set to 0.5 millimeters for each cycle, i.e., in the case of these four cycles. The cutting depth increases always by 0.5 millimeters. If selector switch W8 is set for three cycles, then the cutting depth at each cycle amounts to 0.5 millimeters. In the case of every cycle set by means of the selector switch W9, no adjustment of the cutting depth takes place, i.e., the cutting depth always remains the same in case of these cycles.

Figure 4:
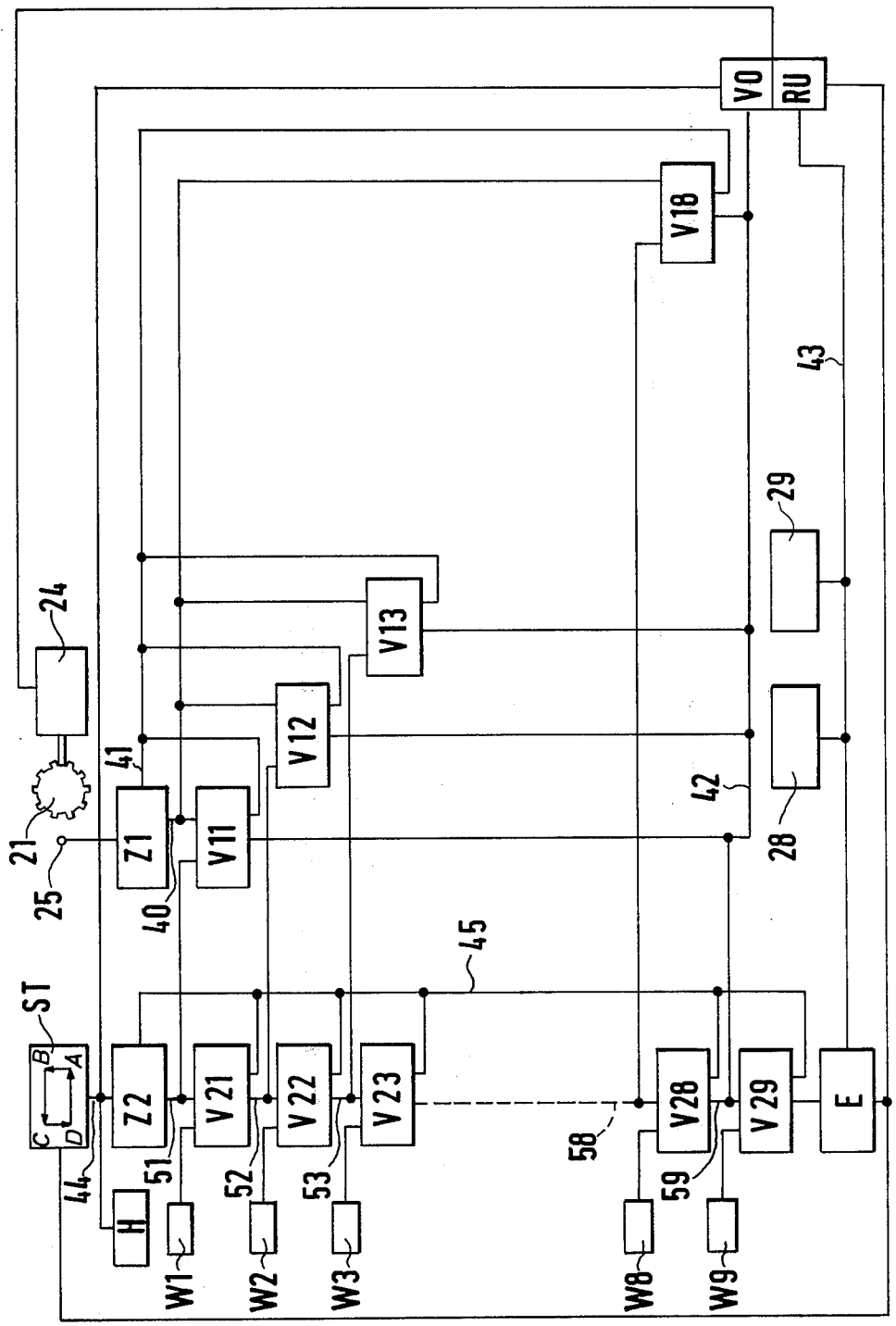
FIG. 4 is a schematic diagram partially in block form, of a control apparatus of FIGS. 1-3.

With the help of the control shown in FIG. 4, the magnitude of the infeed of the tool slide and the number of operating cycles to be carried out with each infeed can be set arbitrarily in a simple manner.

In the preceding paragraphs the production of an outside thread has been described. Whenever an inside thread is to be cut, then the starting position of nut 14 is at the pulse generator 28 and nut 14 moves away in the course of production of the thread of the pulse generator by an amount corresponding to the pertinent storage content of the operatively associated counters. Whenever tool 6 is to carry out only one infeed movement and the workpiece carries out the longitudinal movement, then the sliding path for the tool slide 4 can be arranged directly on bench 1.

While certain advantageous embodiments have been chosen to illustrate the invention, it will be understood by those skilled in the art that various changes and modifications can be made therein without departing from the scope of the invention as defined in the appended claims.

We claim:
1. A thread cutting apparatus for a turning machine of the type having a longitudinal slide path and a tool slide longitudinally movable along the path, the apparatus comprising
  a tool;
  means for supporting said tool on the tool slide, said means comprising
    a piston and cylinder assembly including a piston member and a cylinder member, one of said members being mounted on said tool slide and being longitudinally movable with said tool slide, and the other of said members being laterally movable relative to said one member by application of fluid pressure to said assembly, said tool being mounted on said other of said members; and means for adjusting the lateral position of said other member relative to said one member, said means including a threaded portion on one of said members, an adjusting nut threadedly engaging said threaded portion, a drive shaft for rotatably driving said nut, a drive motor coupled to said drive shaft, pulse transmitter means coupled to said drive shaft for producing signals representative of rotation of said shaft, and means responsive to said signals fo controlling said drive motor.

2. A thread cutting apparatus for a turning machine of the type having a longitudinal slide path and a tool slide longitudinally movable along the path, the apparatus comprising a tool;

means for supporting said tool on the tool slide, said means comprising a piston and cylinder assembly including a piston member and a cylinder member, one of said members being mounted on said tool slide and being longitudinally movable with said tool slide, and the other of said members being laterally movable relative to said one member by application of fluid pressure to said assembly, said tool being mounted on said other of said members; and means for adjusting the lateral position of said other member said means including a drive motor, a threaded extension member connected to the laterally movable one of said members and a rotatable adjusting collar engaging said extension member, said collar having an internal thread and an external thread, the internal thread having a pitch different from the external thread.

3. An apparatus according to claim 2 wherein said means for adjusting includes a pin;

means in said collar for receiving said pin eccentrically with respect to the central axis thereof; and a selectively operable disc, said disc including means for receiving a portion of said pin.

4. An apparatus according to claim 3 wherein said driving motor is coupled to said disc for driving said disc; and said means for adjusting further comprising a pulse generator operatively associated with said disc for controlling the rotation thereof.

5. An apparatus according to claim 4 and further comprising means for indicating the starting position of a preselected portion of the adjusting means, said means comprising a second pulse generator.

6. An apparatus according to claim 4 wherein said means for adjusting includes a first counter connected to receive and count pulses, produced by said pulse generator;

control means for starting said drive motor to adjust the movable one of said members and said tool toward a workpiece; and first comparator means for storing a preselected count representative of a desired position for said tool, said comparator means being connected to said first counter for stopping said drive motor when said first counter accumulates a count equal to said preselected count, and for resetting said first counter.

7. An apparatus according to claim 6 wherein said means for adjusting includes means for producing a pulse during each cycle of operation of the apparatus;

a second counter for counting pulses representative of cycles performed by the apparatus; and second comparator means for storing counts representative of numbers of cycles to be performed by the apparatus and for reversing operation of said drive motor and resetting said second counter when the accumulated count in said second counter equals the count in said second comparator means.

8. An apparatus according to claim 7 wherein said comparator means includes selector switches for preselecting said numbers of cycles to be performed.

9. An apparatus according to claim 7 wherein said pulse generator includes a disc having a plurality of protrusions and proximity sensing means responsive to the passage of said protrusions for producing pulses;

said first comparator means includes a plurality of comparator circuits connected to sequentially remove counts representative of preselected values preset therein; and said second comparator means includes a plurality of series connected sequentially activated comparator circuits, the last of said circuits being connected to stop said drive motor.

10. An apparatus according to claim 9 wherein the number of comparator circuits in said second comparator means is one greater than the number in said first comparator means.

11. A thread cutting apparatus for a turning machine of the type having a longitudinal slide path and a tool slide longitudinally movable along the path, the apparatus comprising a tool;

means for supporting said tool on the tool slide, said means comprising a piston and cylinder assembly including a piston member and a cylinder member, one of said members being mounted on said tool slide and being longitudinally movable with said tool slide, and the other of said members being laterally movable relative to said one member by application of fluid pressure to said assembly, said tool being mounted on said other of said members; and means for adjusting the lateral position of said other member relative to said one member, said means including a threaded portion of one of said members, an adjusting nut threadedly engaging said threaded portion, a drive shaft for rotatably driving said nut, a pin eccentrically penetrating said nut, said pin being connected to said drive shaft, said nut being rotatable with said pin and axially movable relative thereto.

* * * * *